P. P. ALEX.
MILITARY AMBULANCE.
APPLICATION FILED DEC. 18, 1916.
1,233,009.
Patented July 10, 1917.
3 SHEETS—SHEET 1.
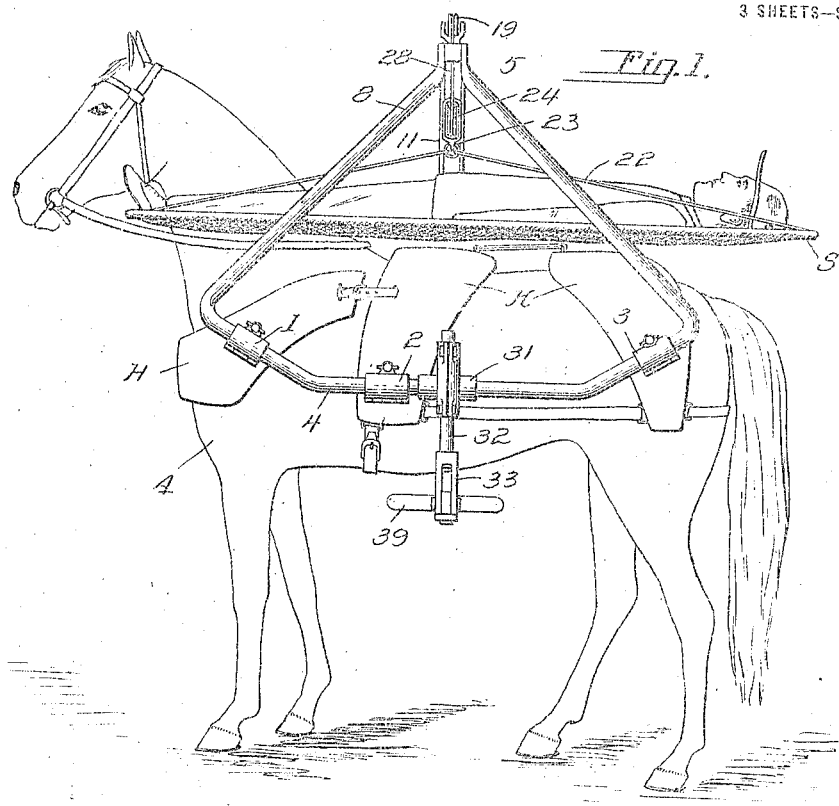
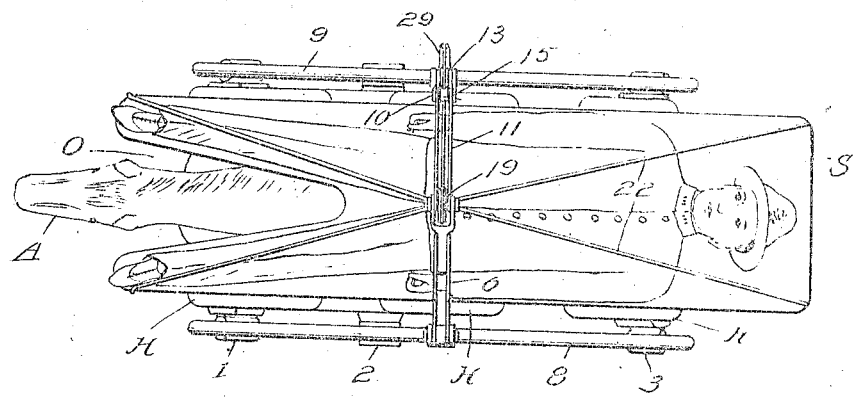
Witnesses
H. C. Gibson
N. J. Collamer
Inventor
Paul P. Alex.
By Victor J. Evans
Attorney

P. P. ALEX.
MILITARY AMBULANCE.
APPLICATION FILED DEC. 19, 1916.

1,233,009.

Patented July 10, 1917.
3 SHEETS—SHEET 2.

Witnesses
F. C. Gibson
N. Collamer

Inventor
Paul P. Alex
By Victor J. Evans
Attorney

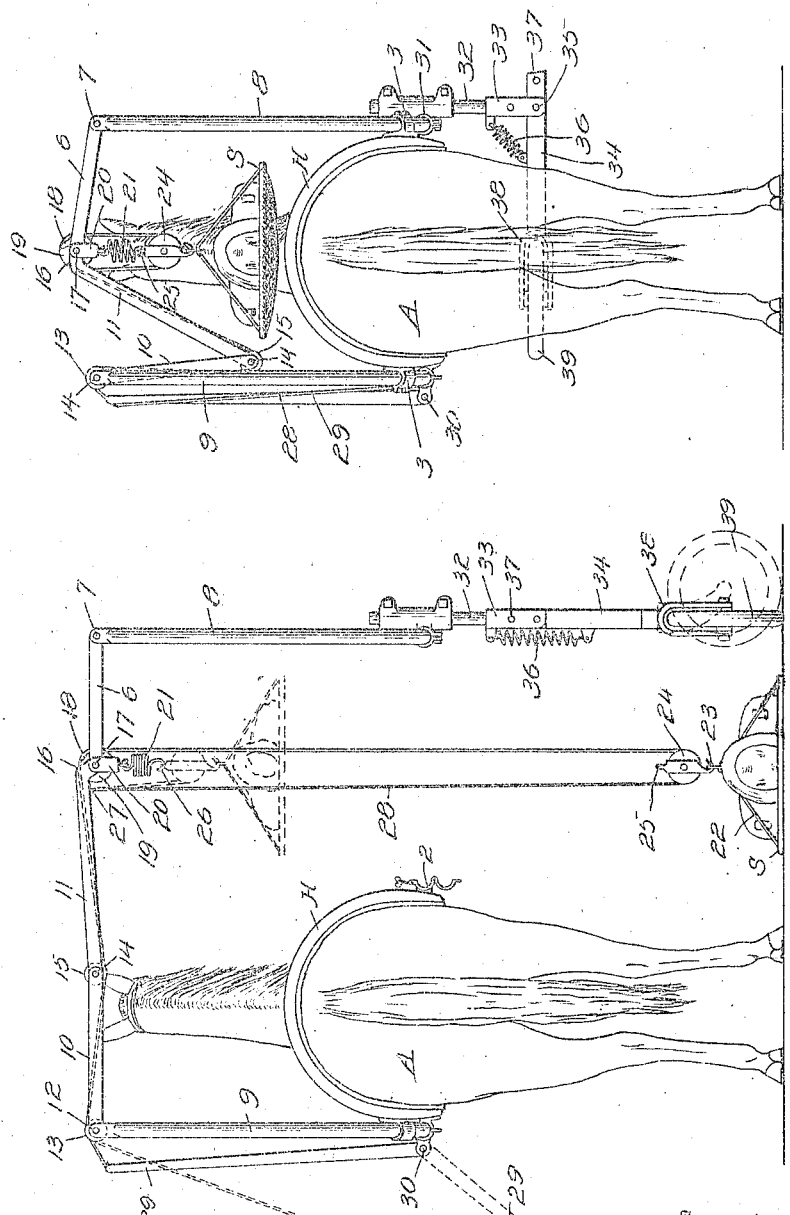

UNITED STATES PATENT OFFICE.

PAUL P. ALEX, OF WORCESTER, MASSACHUSETTS.

MILITARY AMBULANCE.

1,233,009.

Specification of Letters Patent.   Patented July 10, 1917.

Application filed December 19, 1916.   Serial No. 137,862.

*To all whom it may concern:*

Be it known that I, PAUL P. ALEX, a citizen of the United States, residing at Worcester, in the county of Worcester and State of Massachusetts, have invented new and useful Improvements in Military Ambulances, of which the following is a specification.

This invention relates to carriages and wagons, and more especially to ambulances; and the object of the same is to produce a military ambulance capable of being mounted upon a horse or other draft animal and of sustaining a stretcher so as to carry the patient over the animal's back.

The invention consists primarily in the construction by means of which a stretcher of this kind may be slung above the animal and supported in that position by a framework attached to his harness, and secondarily in means whereby the stretcher may be raised into the position desired—all as hereinafter more fully described and claimed and as shown in the drawings wherein:—

Figure 1 is a side elevation.

Fig. 2 is a plan view illustrating my invention as applied to a horse and a wounded soldier on the stretcher.

Fig. 4 is a plan view of the collapsible bridge hereinafter referred to.

Figs. 5 and 6 are rear elevations illustrating the manner in which the stretcher is raised, and in the last two views the so called detachable frame is on the right side of the horse, whereas it is shown in the first three views on the left side.

The letter A designates a draft animal. A horse is herein shown and hereinafter described, although it might be an ox, a camel or other animal. The letter H designates a harness, herein shown as a number of pads secured on the animal A by suitable straps. The letter S designates a stretcher, preferably of that type having two rigid side bars suitably spaced, and a canvas bottom between them to support the patient. No novelty is claimed for these elements, and the purpose of the present invention is to sling the stretcher over the animal's back as suggested above.

Figure 3:
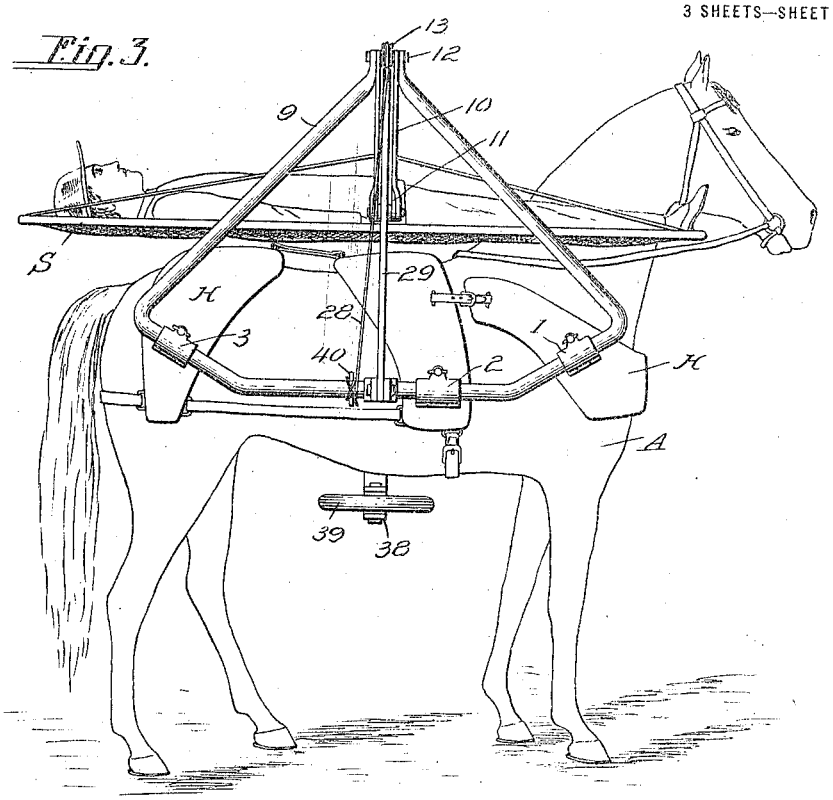
Fig. 3 is a side elevation, viewed from the opposite side to that seen in Fig. 1.
Figure 4:
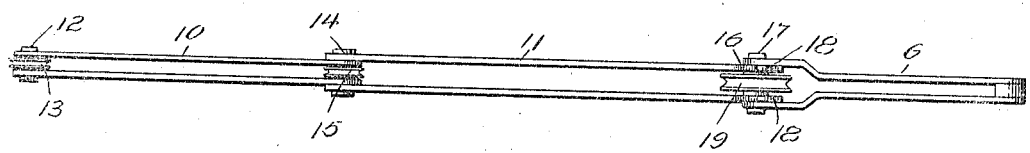

Each side of the harness carries three clips 1, 2 and 3, which are purposely set out of alinement with each other and intended for the removable reception of the angular lower bar 4 of a substantially triangular frame made of piping or other light material, and of such size that its apex 5 rises for some distance above the animal's back. These frames are duplicates, and while both may be detachably connected with the harness, I will hereinafter refer to one as the fixed frame and the other the detachable frame for purposes which will appear. Connecting the apices of the two frames is a collapsible bridge herein shown as consisting of three members. The first is an arm 6 which is connected by a knuckle joint 7 with the upper end of the detachable frame 8, as best seen in Fig. 6, and the other two members are the links 10 and 11 of a toggle lever which is shown distended in Fig. 5 and as knuckled downward in Fig. 6. The inner end of the inner link 10 is pivoted at 12 to the apex of the fixed frame 9, and a pulley 13 surrounds the pivot; the meeting ends of the two links are pivoted together, as at 14, and a pulley 15 surrounds the pivot; and the outer end of the outer link 11 is bent downward to produce a shoulder 16 and is pivoted at 17 to the inner end of the arm 6. The latter has a shoulder 18 contacting with said bend when straightened out, as shown in Fig. 5, and a pulley 19 surrounds the pivot 17. Also on the ends of the pivot pin 17 may hang a yoke 20 which supports a spring 21. Guy ropes 22 are led from the corners of the stretcher S to a hook 23 at the bottom of a pulley 24, and the frame of the latter has an eye 25 at its upper end to engage a hook 26 at the lower end of the spring, as best shown in Fig. 4. Leading from a point 27 on the link 11 is a cable or rope 28 which is carried down and beneath the pulley 24, and thence up and over the pulley 19, then under the pulley 15 and over the pulley 13, and is led away to be drawn on by hand or attached to a suitable operating device, such as a lever 29, herein shown as pivoted at 30 to the intermediate clip supporting the fixed frame 9.

With the parts thus far described it will be clear that when the detachable frame 8 is disconnected from the harness and moved outward as far as the bridge permits, it needs some support in order that it will sustain the outer end of the bridge, so that the latter in turn will sustain the load lifted by the block-and-tackle mechanism, and I preferably construct the support as follows: A clip 31 is mounted on and stands at right angles to the lower bar 4 of this frame 8, and mounted in said clip is a stem 32 at the top of an upper member whose lower end is forked, as at 33. A lower member 34 has its upper end pivoted at 35 in said fork and is adapted to be turned normally on its pivot by means of a spring 36, while such turning is prevented by passing a pin through holes 37 which register when the parts are alined, as will be clear. The lower end of the lower member in turn is forked, as at 38, and journaled therein is a wheel whose tire may be of rubber, this fork being preferably bent as indicated in dotted lines in Fig. 5, so as to produce a caster wheel effect.

With this type of support it will be seen that the detachable frame 8 may be supported from the ground when the lower member 34 is let down, as in Fig. 5, and the wheel 39 touches the earth's surface; but by removing the pin from the holes 37, the lower member may be allowed to move upward under the impulse of the spring 36, when it will assume a horizontal position between the horse's legs and out of the way. At this time the frame will be moved inward to the position shown in Fig. 6 and held by the clips 1, 2 and 3 on that side of the harness, and the bridge will collapse, as indicated.

In order that the supporting pulley 19 may now stand centrally over the horse's back, and the weight of the load thereon be rigidly sustained, the arm 6 is given the length shown and is connected with the frame 8 by the knuckle joint 7, whereas the other arm of the bridge which is made up of the two links 10 and 11 of the toggle will at this time knuckle downward, as suggested above, and as the knuckle joint produced by the shoulders 16 and 18 permits.

The use of this improved ambulance is as follows: Let us assume that a wounded soldier is brought on the stretcher by Red Cross attendants and laid on the ground, as seen in Fig. 5, and that the parts of this device are opened by distending the bridge as therein shown and the horse driven along one side of the stretcher so that the wheel 39 travels along the other side thereof. The rope 28 is paid out, and the pulley 24 descends until the hook 23 can be engaged with a link or eye at the apex of the guy ropes on the stretcher, and then by drawing in on the rope by hand or swinging the lever 29 downward the stretcher and the patient are raised to the position dotted in this view. Next, by knuckling the center of the toggle lever downward its pivot 17 is caused to approach its pivot 12, with the result that the arm 6 and the load carried thereby, the detachable frame 8, and its wheeled support are all moved inward, or, in other words, toward the fixed frame 9—the caster wheel 39 meanwhile traveling over the ground, as will be understood. This brings the stretcher over the back of the horse and the parts to the position shown in Fig. 6, and after the frame 8 has been secured in the clips at the right side of the harness, the pin is removed from the alined holes 37 and the lower member 34 of the support swung inward, as shown. Now, the animal may be driven or led to the field hospital or base hospital, and the value of this improved ambulance becomes apparent, because the character and topography of the land may be such as to render it advisable to employ a draft animal for transporting the patient, rather than a vehicle of any kind, a boat, or human hands—in fact boats may not be available, and there may be a scarcity of hospital attendants, or such as there are may be otherwise employed. I might even suggest that in some places, as where an elephant is the draft animal used, it is quite within the spirit of my invention to amplify the structure so that a stretcher of double or triple width could be carried over the animal's back, or even possible a special type of stretcher built in tiers or otherwise, although details of this feature are not elaborated as it forms no part of the present invention. Having reached the hospital or point of first aid, the above described operation is reversed in order to open out the framework and carefully lower the wounded soldier onto the ground or onto a cot or another stretcher so that he can be taken away by hand.

Having thus described the invention, what is claimed as new, is:—

1. An ambulance of the character described comprising uprights adapted to be connected with opposite sides of the harness of a draft animal in position to rise above its back, a bridge connecting the upper ends of the uprights, and block-and-tackle mechanism supported by said bridge for slinging a stretcher above the animal's back.

2. In an ambulance of the class described, the combination with a plurality of clips adapted for attachment to each side of the harness of the draft animal on a broken line; of two substantially triangular frames, each having its lower bar deflected out of a straight line for engagement with one set of said clips and its apex rising to a point above the animal's back, a bridge connecting said apices, and means for slinging a stretcher from the bridge above the animal's back.

3. In an ambulance of the class described, the combination with two substantially triangular frames, and means for connecting them with opposite sides of the harness of the draft animal so that their apices rise above its back; of a bridge connecting their apices and capable of distention when either frame is detached from the harness and moved laterally therefrom, means for supporting such frame when so detached, and stretcher-supporting means carried by the bridge.

4. In an ambulance of the class described, the combination with two substantially triangular frames, and means for connecting them with opposite sides of the harness of a draft animal so that their apices rise above its back; of a bridge connecting their apices and capable of distention when either frame is detached from the harness and moved laterally therefrom, a mechanical support carried by such frame and including a wheel and means for raising it off the ground when desired, and stretcher-supporting means carried by the bridge.

5. In an ambulance of the class described, the combination with the harness of a draft animal, a fixed frame rising from one side thereof, clips on the other side thereof, a movable frame detachably mounted in said clips and rising therefrom, an extensible bridge connecting the upper ends of the frames and adapted to lead across the animal's back, and stretcher-supporting means carried by the bridge; of an upright clip on the movable frame, and a wheeled support comprising an upper member mounted in said clip, a lower member carrying a caster wheel at its lower end, and pivotal connections between said members whereby the lower member may be turned up to raise the wheel off the ground.

6. In a device of the class described, the combination with a fixed support, and a laterally movable support; of a bridge connecting the upper ends of said supports and including an arm connected with the movable support by a knuckle joint, a toggle whereof the outer extremity of one link is pivoted to the fixed support and the outer extremity of the other link is pivoted to said arm, shoulders on the last-named link and the arm adapted to contact when the links and arm are in substantial alinement, and load-supporting devices carried by this pivot.

In testimony whereof I affix my signature.

PAUL P. ALEX.